United States Patent [19]

Wahr

[11] Patent Number: 5,287,480
[45] Date of Patent: Feb. 15, 1994

[54] CACHE MEMORY FOR INDEPENDENT PARALLEL ACCESSING BY A PLURALITY OF PROCESSORS

[75] Inventor: Alfons-Josef Wahr, Fuerstenfeldbruck, Fed. Rep. of Germany

[73] Assignee: Siemens Aktiengesellschaft, Munich, Fed. Rep. of Germany

[21] Appl. No.: 765,818

[22] Filed: Sep. 26, 1991

[30] Foreign Application Priority Data

Sep. 26, 1990 [DE] Fed. Rep. of Germany ....... 4030435

[51] Int. Cl.⁵ .................... G06F 13/00; G06F 13/40
[52] U.S. Cl. .......................... 395/425; 364/243.41; 364/244.8; 364/965.9; 364/968; 395/325
[58] Field of Search .............. 364/200, 900 MS File; 395/400, 425 MS File; 365/49

[56] References Cited

U.S. PATENT DOCUMENTS

| 4,158,235 | 6/1979 | Cau et al. | 364/900 |
| 4,449,183 | 5/1984 | Flahive et al. | 364/200 |
| 4,905,114 | 2/1990 | Brenza | 364/200 |
| 4,975,872 | 12/1990 | Zaiki | 365/49 |
| 5,056,015 | 10/1991 | Baldwin et al. | 364/200 |

FOREIGN PATENT DOCUMENTS 0214718 3/1987 European Pat. Off. .
0284751 10/1988 European Pat. Off. .

OTHER PUBLICATIONS

IBM Technical Disclosure Bulletin, "Shared Instruction and/or Data Caches in a Multiprocessing System," vol. 27, No. 12, May 1985 pp. 6845-6846.

Primary Examiner—Joseph L. Dixon
Assistant Examiner—Behzad James Peikari
Attorney, Agent, or Firm—Hill, Steadman & Simpson

[57] ABSTRACT

A cache memory structure comprises a cache memory that has a plurality of ports for reading data from the cache memory and a plurality of ports for writing data into the cache memory. A switching network matrix having controllable switch elements for connecting of the cache memory ports to bus terminals is arranged between the bus terminals and processors, to an instruction unit of a processor, to a main memory, and to the cache memory. The switch elements of the switching network matrix are controlled by a cache memory controller such that the bus terminals can be selectively connected to the write or read ports of the cache memory. With the assistance of the switching network matrix, it becomes possible to select the number of ports of the cache memory to be less than the plurality of bus terminals that access the cache memory.

11 Claims, 3 Drawing Sheets

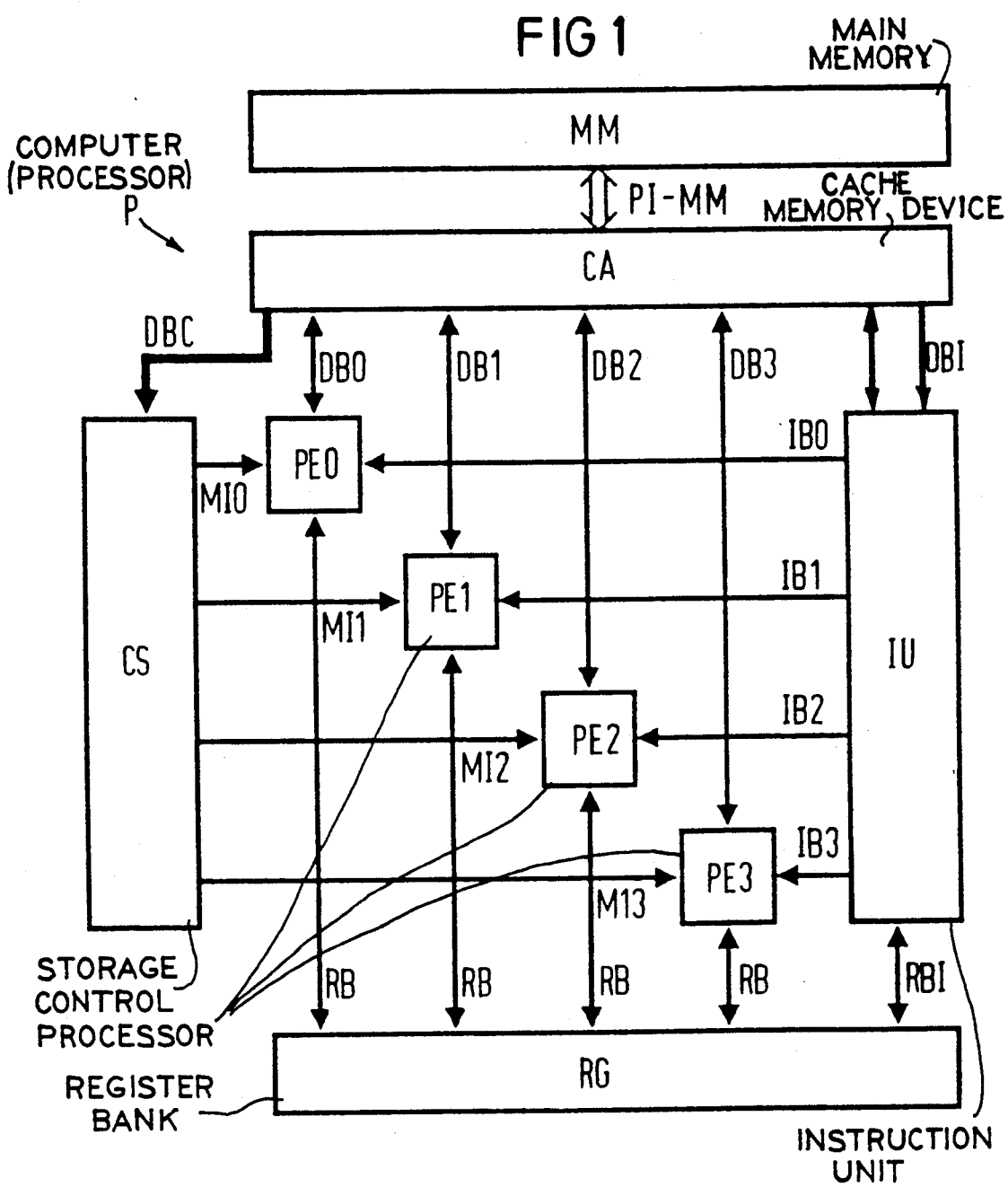

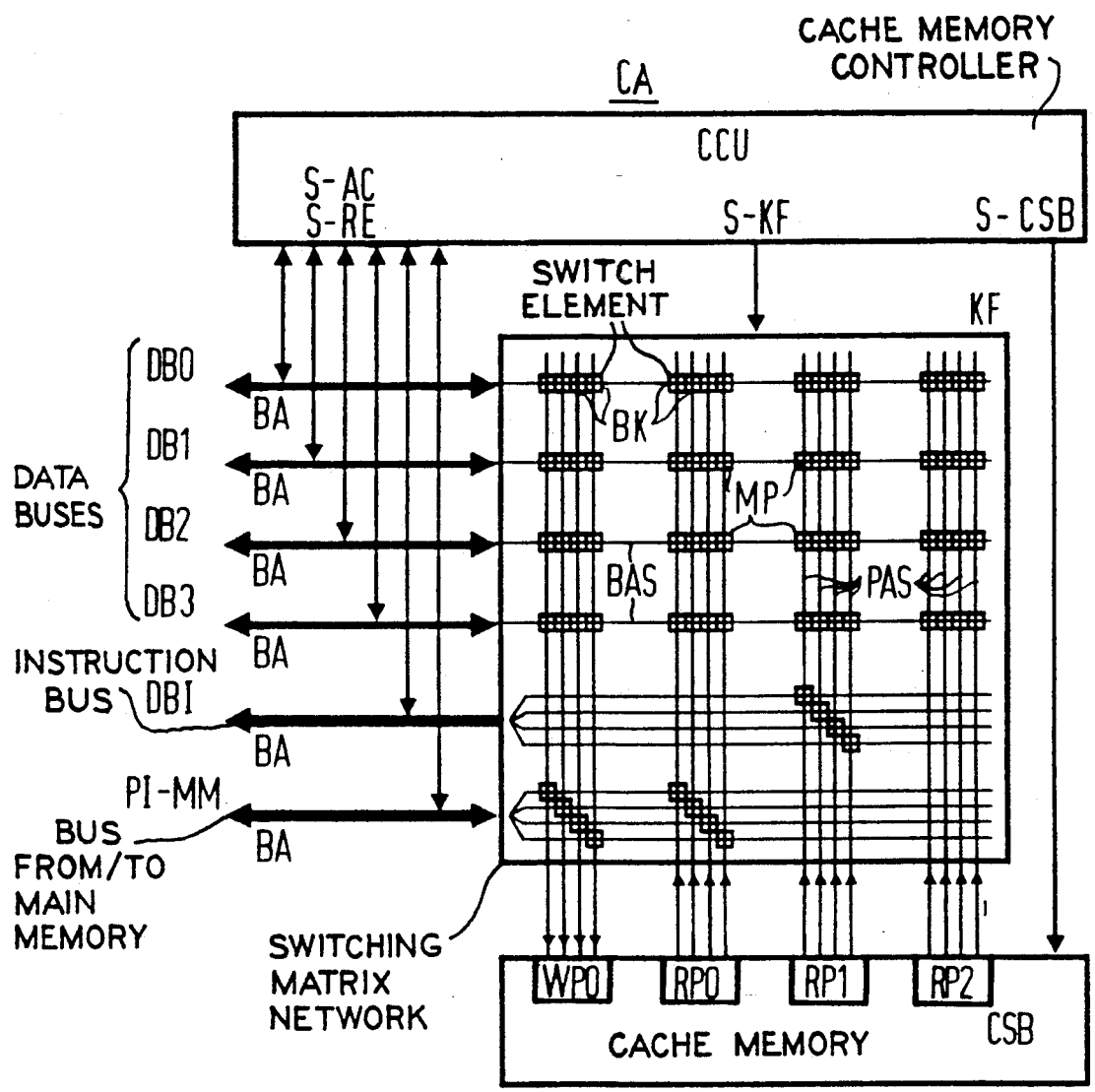

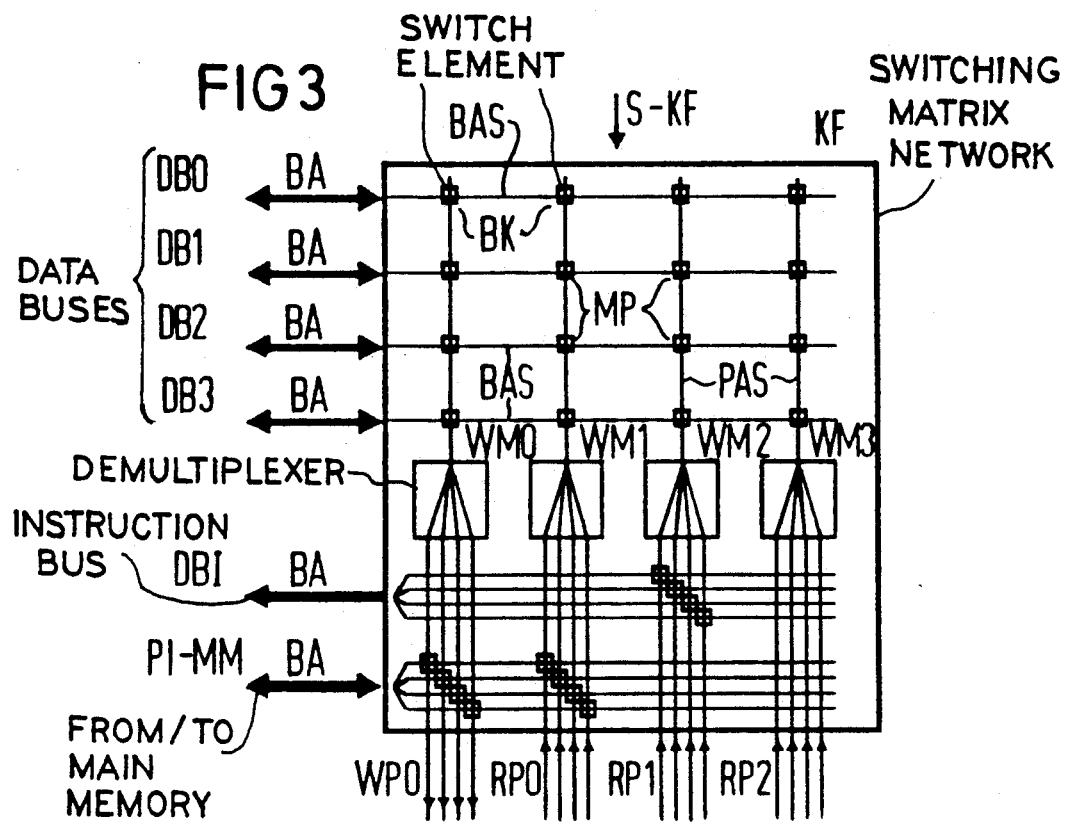
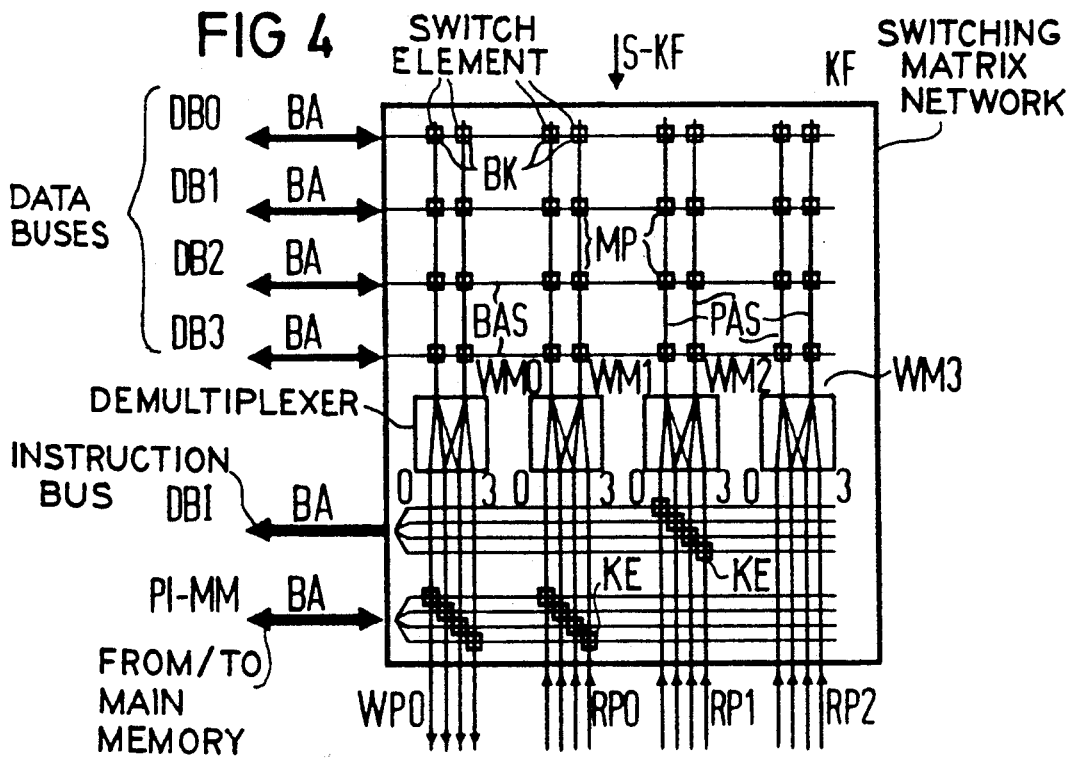

CACHE MEMORY FOR INDEPENDENT PARALLEL ACCESSING BY A PLURALITY OF PROCESSORS

BACKGROUND OF THE INVENTION

1. Field of the Invention

The present invention relates to computers and is more particularly concerned with a cache memory structure that has a plurality of reading ports for reading data therefrom and a plurality of ports for writing data thereinto.

2. Description of the Prior Art

Cache memories are well-known in the art in computer architecture. Such memories serve as buffers between operational units that have different data flow rates within a data processing system and communicate with one another. A command computer can be considered as an example, the command computer having the commands to be processed made available thereto from a main memory. These commands must be offered to the computer with shorter access time than is possible given a main memory having comparatively-great memory capacity. The cache memory is operated such that data and commands requested by the command computer during a program run are located in the cache memory with high probability and can therefore be made available with a short access time.

In order to be able to fully utillized the possibilities of large-scale integration (LSI) and in order to enhance the performance capability of the processors, the cache memory is increasingly being integrated on a chip next to the computer hardware core in computer implementation. It should, therefore, be noted that the capacity of the cache memory is being increasingly expanded. This leads to the fact that a cache memory can no longer be economically fully used by a single central processing unit (CPU).

SUMMARY OF THE INVENTION

The object of the present invention, therefore, is to provide a cache memory structure having a cache memory, whereby the cache memory can be used not only by one CPU, but by a plurality of CPUs.

The above object is achieved, according to the present invention, in a cache memory structure having m bus terminals and which comprises a cache memory having k (where k<m) cache memory ports for reading data from the cache memory and p (where p<m) cache memory ports for writing data into the cache memory. A switching matrix network has controllable switch elements for producing a connection of the cache memory ports to the bus terminals and a cache memory controller for controlling the switch elements of the switching matrix network.

As will be seen, the cache memory can be composed of a cache memory bank or a plurality of cache memory banks. The access to the cache memory bank or banks occurs via internal cache memory ports that can be realized either as unidirectional ports or as bidirectional ports. As a result of the present invention, the number of these ports can be selected smaller than the number of bus terminals that are connected to buses that lead, for example, to units of a computer, such as a CPU or processor elements, to a command unit or to a main memory. What is then achieved with the assistance of the switching matrix network is that each bus terminal can be connected to ports of the cache memory.

The switching matrix network can be realized in a standard manner as a connection network, crossbar distributor or crossbar switch. It contains switch elements by way of which a respective bus terminal can be connected to a port of the cache memory. It is, therefore, advantageous to select the ports of the cache memory to have i words in width, so that a plurality of bus terminals can be connected in parallel to one or more cache memory ports via an appropriate control of the switch elements.

BRIEF DESCRIPTION OF THE DRAWINGS

Other objects, features and advantages of the invention, its organization, construction and operation will be best understood from the following detailed description, taken in conjunction with the accompanying drawings, in which:

FIG. 1 is a block circuit diagram of a processor comprising a plurality of processing elements;

FIG. 2 is a schematic representation of a first realization of a cache memory structure constructed in accordance with the present invention;

FIG. 3 is a schematic representation of a second realization of a cache memory structure constructed in accordance with the present invention; and FIG. 4 is a schematic representation of a third realization of a cache memory structure constructed in accordance with the present invention.

DESCRIPTION OF THE PREFERRED EMBODIMENTS

According to FIG. 1, a computer (processor) P comprises n processor elements (also referred to as arithmetic units or CPUs), four such processors PE0-PE3 being illustrated, a cache memory CA, an instruction unit IU, a register bank RG and, potentially, a storage memory CS. The computer P is connected to a main memory MM via the cache memory CA.

The processors PE0-PE3 are connected via a plurality of data buses DB0-DB3 to the cache memory device CA. These processors are also connected via instruction buses IB0-IB3 to the instruction unit IU, to the register bank RG via register buses RB and to the storage control CS via control lines MI0-MI3. The microprograms that are required for the operation of the processors PE0-PE3 can reside in the storage memory CS. The instruction unit IU can likewise be connected to the cache memory CA, just as the main memory MM, via a bus PI-MM. It is also possible that the instruction unit IU is connected to the register bank RG via a bus RBI. The structure of the cache memory CA of the computer P shall be set forth below. Referring to FIG. 2, the cache memory structure CA comprises a cache memory CSB, a switching matrix network KF and a cache memory controller CCU. The cache memory CSB can be composed of a memory bank or of a plurality of memory banks and has a known structure. The cache memory CSB provides cache memory ports WP0, RP0, RP1, RP2 that are unidirectionally realized in this exemplary embodiment. The port WP0 (there can also be a plurality of write ports) serves the purpose of writing into the cache memory; the ports RP0-RP2 serve the purpose of reading from the cache memory. The cache memory ports form the interface of the cache memory CSB with the switching matrix network KF.

The switching matrix network KF is composed of switch elements BK that are arranged at the matrix points MP of the switching matrix network KF. At the matrix points MP, port terminal lines PAS meet bus terminal lines BAS to whose bus terminals BA the data buses DB of the processor elements PE are connected. The bus PI-MM to the main memory MM, and the instruction bus DBI is connected to the instruction unit IU. The buses can, therefore, be connected to the ports with the assistance of the switch elements BK.

The buses can have the width of a word or the width of a plurality of words. The analogous case applies for the cache memory ports. These can also have the width of a word or the width of a plurality of words. It is assumed, for example, in the exemplary embodiment of FIG. 2 that the buses DB0–DB3 are one word wide, whereas the buses DBI and PI-MM as well as the ports are four words wide. In general, the buses are i words wide and the ports are j words wide, where i and j are whole numbers.

The control of the switch elements BK occurs with the assistance of the cache memory controller CCU. The cache memory controller CCU generates control signals S-KF that are supplied to the switching matrix network KF and drive the individual switch elements BK located therein. To this end, the cache memory controller CCU receives control signals (request signals) S-RE via the buses DB, DBI, PI-MM that it then acknowledges with signals S-AC when an access to the cache memory CSB can be implemented. The control of the cache memory CSB required for this purpose occurs via control signals S-CSB.

FIG. 2 illustrates a first realization of a switching matrix network KF. A plurality of switch elements BK that is the same in number as the word width of the cache memory ports are located at the matrix crosspoints MP of the switching matrix network KF. Since the cache memory ports are four words wide in this exemplary embodiment, four switch elements BK are, respectively, arranged at the matrix points MP. Since the switch elements can be separately selected per matrix point MP, it is possible that up to four words can be transmitted in parallel via a cache memory port to the cache memory CSB or, respectively, can be read therefrom. The cache memory port WP0 is thereby used for writing, and the cache memory ports RP0–RP2 are used for reading.

The plurality p of write ports WP needed for the processor elements PE can be estimated with the assistance of the relationship.

$$p \approx \text{round}[[w_w + w_{w\text{-}Miss} \cdot t_{w\text{-}La}] \cdot n \cdot w_{PBi}/f] \quad (1)$$

where p denotes the number of write ports at the cache memory CSB, $w_w$ represents the write access probability, $W_{w\text{-}miss}$ represents the probability of a cache memory miss, $t_{w\text{-}La}$ denotes the write access time to the main memory MM, $W_{PBi}$ denotes the mean access probability of the external bus DB, n denotes the number of connected processor elements PE, f denotes a parallelism factor, i.e. how many accesses are possible on average, in parallel, per port.

For example, $w_w=0.2$, $w_{w\text{-}Miss}=0.1$, $t_{w\text{-}La}=4$, $w_{PBi}=0.5$ and $f=4$ can be selected. It then follows that a $p=1$ write port is approximately required.

The plurality k of read ports RP can be calculated in a corresponding manner according to the following relationship.

$$k \approx \text{round}[[w_r + w_{r\text{-}Miss} \cdot t_{r\text{-}La}] \cdot n \cdot w_{PBi}/f] \quad (2)$$

where k is the plurality of read ports at the cache memory CSB, $w_r$ is the read access probability, $w_{r\text{-}Miss}$ is the probability of a cache memory miss, $t_{r\text{-}La}$ is the read access time to the main memory, $w_{PBi}$ is the main access probability of the data bus DB, n is the number of connected processor elements PE, and f denotes the parallelism factor.

The following could be selected as an example: $w_r=0.8$, $w_{r\text{-}Miss}=0.1$, $t_{r\text{-}La}=4$, $n=4$, $w_{PBi}=0.5$ and $f=2$. The result here is that $k=1$ results as the approximate number of read ports RP.

A further realization of the switching matrix network KF results from FIG. 3. Here, only one switch element BK is provided per matrix point MP. The switch element BK is capable of connecting the bus terminal lines BAS to the cache memory ports. The divisions of the words to be transmitted onto the cache memory ports that are several words wide occurs with the assistance of multiplexers (demultiplexers) WM. A savings in the number of switch elements BK is achieved with this construction and, therefore, the expense is considerably reduced.

A further possible solution can be seen in FIG. 4. Two switch elements BK by way of which each bus terminal line BAS can be coupled to two port terminal lines are provided here per matrix point MP of the switching matrix KF. The division onto the ports that are four words wide again occurs with the assistance of the multiplexers (demultiplexers) WM.

It is advantageous when the instruction unit IU has its own read port available, for example the read port RBI (FIG. 1). The processor elements PE can then not access this read port or can only access the same with a low priority. An analogous case also applies to the main memory MM. In order to be able to write a datum from the cache memory into the main memory MM, independently of the processor elements PE, an independent read port, for example the read port RPO, is beneficial. A separate write port can also be provided.

The cache memory controller CCU controls the switching matrix network KF with the assistance of the control signals S-KF and controls the cache memory CSB with the assistance of the control signals S-CSB. Furthermore, the control signals supplied to the cache memory controller CCU by the buses DB are processed, like the request signals S-RE and possible access collisions are thereby localized and eliminated. The request signals S-RE arriving from the processor elements PE are processed according to the declared priority. By driving the switch elements BK, two or more accesses with a maximum of i accesses can occur in parallel onto a port that is i words wide. The word addresses for each word are connected through from the buses to the cache memory ports. The requests S-RE are acknowledged by the cache memory controller (CCU, FIG. 2) with the signals S-AC. In case of a miss, a necessary main memory access is triggered, and the new datum is transmitted into the cache memory CSB.

Control signals are transmitted on the buses DB or PI-MM to the cache memory controller CCU or, respectively, from the cache memory controller to the switching matrix network KF, to the cache memory CSB or to the data buses DB, PI-MM. The control signals are therefore provided for the operation of the cache memory controller CCU. For example, the corresponding control signals can be triggered with the assistance of a microprogram contained in the cache memory controller.

The switch elements can be bus couplers having a known structure. The switch elements must be suitable for connecting through a datum that is i words wide on the buses. When the buses are one word wide, as in the exemplary embodiment, and, for example, the word comprises 36 bits, the switch element must be capable of switching 36 bits. The switch elements KE for the instruction bus DBI and for the memory bus PI-MM can be arranged as shown on the drawings. Therefore, it is possible to read an information word that is i words wide from the cache memory CSB or, respectively, to write the same thereinto. The cache memory ports can be constructed, therefore, in a standard manner.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A computer structure comprising:
a plurality (m) of data buses including data bus lines;
a cache memory including a plurality (k) of cache memory read ports for reading data therefrom, where k<m, and a plurality (p) of cache memory write ports for writing data thereinto, where p<m;
each of said read ports and write ports including port lines extending to cross said data bus lines to form crosspoints therewith;
a switching matrix network including said crosspoints and a plurality of controllable switches with at least one of said controllable switches at selected ones of said crosspoints; and
a cache memory controller connected to and operable to selectively control said controllable switches for data transfer between said cache memory and said plurality of data buses, wherein each of said ports of said cache memory comprises a word width of i words and each of said buses comprises a width of j words where i>j and further wherein a maximum of i words can be switched in parallel to said cache memory from a plurality of processors.

2. A computer structure comprising:
a plurality of data buses including data bus lines;
a cache memory including a plurality of cache memory read ports for reading data therefrom and a plurality of cache memory write ports for writing data thereinto;
each of said read and write ports including port lines extending to cross said data bus lines to form crosspoints therewith;
a switching matrix network including said crosspoints and a plurality of controllable switches with at least one of said controllable switches at selected ones of said crosspoints;
a cache memory controller connected to and operable to selectively control said controllable switches for data transfer between said cache memory and said plurality of data buses wherein said cache memory controller includes means for controlling said controllable switches to connect in parallel said data bus terminals to said cache memory;
a plurality of processors;
wherein each of said ports of said cache memory comprises a word width of i words;
said buses comprise a width of j words; and
a maximum of i words can be switched in parallel to said cache memory from said plurality of processors.

3. The computer structure of claim 2, and further comprising:
a main memory; and
a memory bus connecting said main memory to said switching matrix network which forms additional crosspoints with said read and write ports; and
additional controllable switches at selected ones of said additional crosspoints connected to and controlled by said cache memory controller.

4. The computer structure of claim 3, wherein:
said cache memory comprises a plurality of separately drivable cache memory banks.

5. The computer structure of claim 2, wherein:
said switching matrix network comprises said plurality of controllable switch elements arranged at intersections of rows and columns, said plurality of controllable switches being arranged at intersections of said switching matrix network for connecting lines of said data buses that are j words wide to lines of said ports that are i words wide.

6. The computer structure of claim 2, and further comprising:
a multiplexer connected to provide, from a data bus, a word which is j words wide to port terminal lines that are i words wide.

7. The computer structure of claim 5, wherein:
at least two of said controllable switches are provided per selected crosspoint;
and further comprising:
a plurality of word multiplexers connected to multiplex words from at least two of said port lines onto each of said memory ports that are i words wide, and each of said plurality of word multiplexers arranged between said cache memory ports and said port terminal lines of a respective column of said controllable switches of said switching matrix network.

8. The computer structure of claim 7, wherein: said plurality (p) of write ports is determined by the equation $$p \approx \text{round}[[w_w + w_{w\text{-}Miss} * t_{w\text{-}La}] * n * w_{PBi}/f] \qquad (1)$$

where p is the number of write ports, $w_w$ is the write access probability, $w_{w\text{-}Miss}$ is the probability of cache memory miss, $t_{w\text{-}La}$ is the write access probability to the main memory, $w_{PBi}$ is the write access probability of the processor buses, n is the number of connected processors elements, and f is a factor corresponding to an average number of possible accesses, in parallel, per port.

9. The computer structure of claim 7, wherein: said plurality (k) of read ports is determined by the equation:

$$k \approx \text{round}[[w_r + w_{r\text{-}Miss} * t_{r\text{-}La}] * n * w_{PBi}/f] \qquad (2)$$

where k is the number of read ports, $w_r$ is the read access probability, $w_{r\text{-}Miss}$ is the probability of a cache memory miss, $t_{r\text{-}La}$ is the read access time onto the main memory, $w_{PBi}$ is the mean access probability of the processor buses, n is the number of connected processor elements, and f is a factor corresponding to an average number of possible accesses, in parallel, per port.

10. The computer structure of claim 7, wherein, a separate read port is provided at the cache memory for the instruction unit.

11. The computer structure of claim 7, wherein: a separate write port for the cache memory is provided for the main memory.

* * * * *